United States Patent [19]

Sirinyan et al.

[11] Patent Number: 5,405,664

[45] Date of Patent: Apr. 11, 1995

[54] TUBULAR CASING WITH AN ORGANOCHLORINE-FREE COATING IMPERMEABLE TO OXYGEN AND WATER VAPOR, A PROCESS FOR ITS PRODUCTION AND ITS USE

[75] Inventors: Kirkor Sirinyan, Bergisch Gladbach; Hanns-Peter Müller, Odenthal; Rolf Dhein, Krefeld; Gunter Weber, Fallingbostel; Sebastian Meyer-Stork, Walsrode; Michael Stiem, Eicheloh, all of Germany

[73] Assignee: Wolff Walsrode AG, Walsrode, Germany

[21] Appl. No.: 19,396

[22] Filed: Feb. 18, 1993

[30] Foreign Application Priority Data

Feb. 25, 1992 [DE] Germany ............ 42 05 631.4
Oct. 8, 1992 [DE] Germany ............ 42 33 884.0

[51] Int. Cl.$^6$ ............................................. A22C 13/00
[52] U.S. Cl. .................... 428/34.8; 138/118.1; 206/802; 426/105; 426/129; 426/138; 426/277; 426/516; 452/35
[58] Field of Search ............ 428/34.8; 138/118.1; 206/802; 426/105, 129, 138, 277, 516; 452/35

[56] References Cited

U.S. PATENT DOCUMENTS

| | | | |
|---|---|---|---|
| 3,912,839 | 10/1975 | Ramagopal | 428/35 |
| 4,123,589 | 10/1978 | Korlatzki et al. | 428/425 |
| 4,248,900 | 2/1981 | Hammer et al. | 426/105 |
| 4,287,217 | 9/1981 | Hammer et al. | 426/105 |
| 4,563,231 | 1/1986 | Porrmann et al. | 156/90 |

*Primary Examiner*—Charles R. Nold
*Attorney, Agent, or Firm*—Sprung Horn Kramer & Woods

[57] ABSTRACT

This invention relates to a multilayer organochlorine-free tubular casing consiting of a. a regenerated cellulose substrate,
b. optionally a layer of primer,
c. a 5 to 40 μm thick, organochlorine-free polymeric water vapor barrier layer which is characterized in that it has a permeability to water vapor of at most 50 g/m$^2$.24 h and a surface tension $\leq$ 34 mN/m,
d. a 5 to 40 μm thick, polymeric organochlorine-free oxygen barrier layer, characterized in that it has a permeability to oxygen of at most 120 cm$^3$/m$^2$.24 h bar and a surface tension of $\geq$ 38 N/m.

The invention also relates to its use as a casing for sausages of the Kochwurst and Brühwurst type.

9 Claims, No Drawings

TUBULAR CASING WITH AN ORGANOCHLORINE-FREE COATING IMPERMEABLE TO OXYGEN AND WATER VAPOR, A PROCESS FOR ITS PRODUCTION AND ITS USE

BACKGROUND OF THE INVENTION

1. Field of the Invention

This invention relates to a multilayer organochlorine-free tubular casing consisting of
   a. as a regenerated cellulose substrate,
   b. optionally a layer of primer,
   c. a 5 to 40 μm thick, organochlorine-free polymeric water vapor barrier layer which is characterized in that it has a permeability to water vapor of at most 50 g/m$^2$.24 h and a surface tension of $\leq$ 34 mN/m,
   d. a 5 to 40 μm thick, polymeric organochlorine-free oxygen barrier layer, characterized in that it has a permeability to oxygen of at most 120 cm$^3$/m$^2$.24 h bar and a surface tension of $\geq$ 38 N/m, to a process for its production and to its use as a casing for sausages of the Brühwurst and Kochwurst type (fine emulsion sausage and cooked sausage).

In the context of the invention, an "organochlorine-free tubular casing" is understood to be a casing free from covalently bonded chlorine atoms.

2. Description of Related Art

Tubular casings based on cellulose, for example regenerated cellulose, which are produced by longitudinally folding and bonding the overlapping, longitudinally extending margins, are already known (see, for example, EP 0 037 543, EP 0 054 162, U.S. Pat. No. 2,148,884, U.S. Pat. No. 2,226,442, U.S. Pat. No. 2,685,769, U.S. Pat. No. 2,685,770, U.S. Pat. No. 2,757,495 and U.S. Pat. No. 2,773,773).

Other processes for the continuous production of fiber-reinforced cellulose hydrate casings and machines for carrying out these processes are described in DE 2 829 102 and DE 2 512 994.

Tubular casings of the type in question are permeable inter alia to water vapor and oxygen which is desirable, for example, where they are used as casings for sausages of the Rohwurst (dry sausauge) type, but is a disadvantage where the casings are used for sausages of the Kochwurst and Brühwurst type. Sausages of this type require casings that are impermeable to water vapor in order to avoid losses of water during the production and storage of the sausage. They also require an effective oxygen barrier to prevent oxidative damage to the sausage mix.

Accordingly, tubular cellulose casings are often subsequently coated to achieve these barrier layer properties. In addition to the barrier effect, suitable coatings must also show adequate adhesion to the tubular casing and sufficient resistance to be able to withstand the various thermal and mechanical loads typically applied during the processing of sausages. In addition, the coated casing has to be able to undergo hydrophilic shrinkage during ripening of the sausage and must show adequate stability in storage.

For this reason, thermally stable, elastic, halogenated polyolefins, preferably polyolefins containing vinylidene chloride (PVDC) or copolymers thereof and copolymers of acrylic acid, methacrylic acid and acrylonitrile are used for this purpose (cf. for example DE 2 512 994 and EP 0 054 162).

For ecological reasons, however, there is a need to use organochlorine-free systems for this purpose.

Casings based on cellulose hydrate suitable for use as casings which have a coating of a vinylidene chloride homopolymer or copolymer, are commercially available either as rolls or as cuts tied at one end. Sausage casings in relatively large quantities, for example of 20 to 50 m or more, are generally gathered and compressed to form rod-like structures approximately 20 to 50 cm in length (strands).

The tubular casings are then continuously filled with sausage mix by known sausage filling machines which force the meat into the tube. However, this efficient sausage filling process cannot be carried out with casings of cellulose hydrate having a barrier layer coating based on thin, 5 to 40 μm thick chlorine-free polymers or copolymers, because casings of this type are unable to withstand the severe mechanical stressing involved. The mechanical stressing damages the coating above all at the edges of the folds. This leads to an unwanted increase in the permeability of the coating to water vapor and oxygen, with the result that the keeping properties and quality of the sausage are permanently impaired.

Accordingly, the problem addressed by the present invention was to provide tubular casings of which the coating would be free from organochlorine and which, at the same time, would exhibit the properties required for the production of sausages of the Kochwurst and Brühwurst type which have hitherto been provided by PVDC-containing coatings.

This problem has surprisingly been solved by providing the tubular casing with a multilayer, organochlorine-free polymeric coating having various surface tensions.

The solution to this problem as provided by the invention is surprising because it is known that the polymer coatings with surface tension of 36 to 45 mN/m, such as acrylonitrile copolymers etc., are hydrophilic plastics with a water absorption capacity of $\geq$ 2%. In addition, the combination of the various components of the present coating surprisingly provides distinctly better barrier properties than the sum total of the barrier effects of the individual components.

It is known from the literature that polyvinyl alcohols in the dry state are distinguished by excellent barrier behavior with respect to oxygen (cf. for example, Polymer Handbook, Chapt. VI, page 439, John Wiley and Sons, New York/Toronto/Brisbane, 1989).

These polymers are also highly hydrophilic plastics. They have a water absorption capacity of $\geq$ 2% and their favorable oxygen barrier property is adversely affected by the water taken up. For this reason, they cannot be used in the field in question.

SUMMARY OF THE INVENTION

The present invention relates to a tubular casing, more particularly for use as a sausage casing for Kochwurst and Brühwurst, characterized in that it consists of
   a. a regenerated cellulose substrate,
   b. optionally a layer of primer,
   c. a 5 to 40 μm thick, organochlorine-free oxygen and water vapor barrier layer which has a permeability to water vapor of at most 50 g/m$^2$.24 h and a surface tension $\leq$ 34 mN/m and
   d. a 5 to 40 μm thick, chlorine-free oxygen barrier layer which has a permeability to oxygen of at most 120 cm$^3$/m$^2$.24 h bar and a surface tension of $\geq$ 38 N/m.

Base materials for the production of tubular casings include cellulose (cellophane, regenerated cellulose, cellulose hydrate) and cellulose derivatives, such as cellulose ethers, proteins, carbohydrates, collagen, alginates, starches and other natural or synthetic polymers. Thus, cellulose fibers produced by the viscose process (cf. for example, U.S. Pat. No. 3,884,270), by denitrification of cellulose nitrate or by hydrolysis of other cellulose derivatives with aqueous or alcoholic alkali metal solutions (cf. U.S. Pat. No. 3,546,209) may be used. Other cellulose materials, such as cellulose ethers, for example alkyl or hydroxyalkyl cellulose or mixed ethers, can also be processed to substrates.

Tubular casings which, in addition to cellulose hydrate, also contain additional plasticizers, such as glycol, glycerol, polyglycol, sorbitol and water, may of course also be used.

Modified cellulose hydrate types obtainable by reaction of cellulose hydrate with alkyl amine and/or alkyl amide bis-dimethylene triazinone tetramethylene triazinone tetramethylol may also be used for the production of the tubular casings according to the invention.

The tubular casings according to the invention may be fiber-reinforced. This may be done in known manner, for example using hemp or flax fibers or synthetic fibers based on polyamide, polyester or polyacrylonitrile, etc. The web-like fiber reinforcement may be a textile material such as, for example, a nonwoven of random or ordered spun fibers, a filament or multifilament of natural or synthetic material, a woven fabric, network, lattice or knitted fabric.

In addition to the base material and, optionally, reinforcing fibers, the tubular casings may contain additional components which may act, for example, as softeners. In addition, other auxiliaries, such as pigments or anti-bactericides, may also be used.

Cellulose-based tubular casings are frequently produced by the viscose process. It is known that viscose solutions can be produced, for example, by reaction of alkali cellulose with carbon disulfide to form the xanthate. Where fiber-reinforced tubular casings are used, the viscose solution is applied inter alia by coating, dip-impregnating or spraying the non-woven web with the viscose solution (cf., for example, U.S. Pat. No. 2,999,788). In the subsequent processing steps, the viscose-containing intermediate products are treated in a precipitation bath containing sulfuric acid to regenerate the cellulose, subsequently washed with water until neutral, desulfurized in a sodium sulfite bath and impregnated with softeners in another bath. After final drying at 80° to 140° C. and conditioning, the tubular cellulose casings have a thickness of 20 to 50 $\mu$m and a weight per unit area of 25 to 650 g/m$^2$.

The tubular casings are then optionally provided with a "firmly adhering" coating.

In the context of the invention, a "firmly adhering coating" is understood to be a coating which adequately withstands the thermal and mechanical loads typically applied in the processing of sausages.

A "firmly adhering coating" is also understood to be a coating which rules out destruction of the water vapor and oxygen barrier layers and their delamination from the tubular casing despite storage in boiling water for 7 hours and also after contact with the sausage filling.

The present invention also relates to a process for producing firmly adhering coatings on tubular casings preferably based on regenerated cellulose, characterized in that the surface of the casings are coated with primers, preferably in the form of neutral or cationic polyamines or polyamidopolyamines.

Primers of this type are known (cf., for example, U.S. Pat. No. 2,573,956 or GB-PS 908,205). Reaction products of aliphatic polyamines, such as 2,6-polyamide, ethylenetriamine and epichlorohydrin are suitable primers, as are polyamines produced by reaction of epichlorohydrin with dipropylenetriamine or with bis-(3-aminopropyl)-methyl amine.

The polyamidopolyamines suitable for the coating process according to the invention can be produced by condensation of aliphatic carboxylic acids containing 3 to 15 carbon atoms in the molecule with one of the above-mentioned polyamines containing at least one secondary and two primary amino groups, for example polyalkylene polyamines. Suitable carboxylic acids are, above all, diglycolic acid, succinic acid, glutaric acid and adipic acid. Cationic types are of course equally suitable for carrying out the process according to the invention.

The primer is preferably applied from aqueous solution and dried in moderate heat ($\sim$100° C.). The primer solution may advantageously contain cellulose plasticizers, more particularly monohydric or polyhydric alcohols, such as glycerol and/or propanediol, or mixtures thereof in the usual quantities. The primer may of course be applied to the surface of the casing in the form of an organic solution, for example in gasoline, ethyl acetate, toluene, acetone or alcohols, or as a melt.

Other primers may also be used for carrying out the process according to the invention providing they show high resistance to boiling and mechanical stability and meet food regulations. Polyacrylates, copolymers thereof with styrene and butadiene and ethylene/vinyl acetate copolymers are mentioned in this regard.

A key feature of the invention is that the water vapor barrier layer is also olefin-modified.

According to the invention, the claimed olefin modification is carried out using waxes of natural and synthetic origin and mixtures thereof. Natural waxes are, for example, candelilla wax, carnauba wax, montan wax and paraffin wax, while synthetic waxes are inter alia paraffin and polyethylene waxes. Compounds such as these are known and are described in detail, for example, in Ullmanns Encyklopädie der technischen Chemie, Vol. 24, pages 1 to 49, Verlag Chemie, Weinheim (1983).

The melting range of the waxes to be used in accordance with the invention is limited by the fact that, on the one hand, the coating is required to show adequate resistance to hot water and, on the other hand, complete film formation should be possible during the coating process. Accordingly, the melting range is preferably between 50° and 110° C. and, more preferably, between 60° and 90° C. Mixtures of relatively high-melting and low-melting waxes have proved to be effective in that range. So far as the particle size of the dispersed or emulsified waxes is concerned, particle diameters below 0.1 $\mu$m and, more particularly, below 0.05 $\mu$m are preferred.

The organohalogen-free coating is preferably applied from aqueous solution, emulsion or dispersion. Accordingly, the emulsifiability or dispersibility of the waxes suitable for use in accordance with the invention can be improved in known manner through the incorporation of polar groups (cf. for example G. A. Russel, J. Am. Chem. Soc., 79 (1957) 3871; M. Irving et al., Polym. Degrad. Stab., 5 (1983) 467; N. G. Gaylord, J. Polym. Sci. Polym. Lett. Ed., 21 (1983) 23–30; A. Neyishi et al., J. Appl. Polym. Sci., 22 (1978) 2953 and A. Hoff, J. Appl. Poly. Sci., 29 (1984) 465). The corresponding processes have also been described (for example in G. M. Gale, Appl. Organomet. Chem., 2 (1988) 17–31).

Dispersions or emulsions based on polymerized ethylene, propylene and butylene or copolymers thereof are also suitable for carrying out the polyolefin modification according to the invention. However, those having a melting range of 80° to 130° C. are preferred for carrying out the process according to the invention, those having a melting range of 100° to 130° C. being particularly preferred.

Their molecular weight can vary within wide limits of 1,500 to $1 \times 10^6$ g/mol. However, those having a molecular weight of 3,000 to 100,000 g/mol are particularly preferred.

The polyolefin emulsions or dispersions mentioned are known. They may readily be produced by the direct route of emulsion or dispersion polymerization (cf. Kunststoff-Handbuch, Vol. IV, Polyolefine (Polyolefins), Hanser Verlag München (1969) and DE 2 338 478).

The quantity of the polyolefin or wax based on the said emulsions or dispersions can be varied within wide limits of 1 to 50% by weight (based on the binder as a whole). Quantities of 10 to 30% by weight are preferred and quantities of 15 to 20% by weight are particularly preferred.

According to the invention, the polymer resins used for the claimed organohalogen-free coating are systems which provide for fine dispersion of the described waxes and enable them to be safely anchored to the interface of the substrate, resulting in thermally and mechanically stable hydrophobicization of the substrate material.

Preferred $H_2O$-vapour impermeable polymer resins are bipolymers and terpolymers of at least two of the following monomers: acrylates, methacrylates, vinyl acetate, vinyl alcohol, ethylene, propylene, butadiene, styrene, acrylic acid, methacrylic acid, acrylamide and acrylonitrile. Mixtures thereof with one another may of course be used to carry out the process according to the invention.

Copolymers of the type in question and processes for their production are known and have been described in detail (cf. for example, R. W. Lenz, Organic Chemistry of Synthetic High Polymers, Interscience Publishers, New York (1976) or Encyclopedia of Polymer Science and Engineering, Wiley Interscience, New York (1985), pages 211–299).

The molecular weights of the copolymers suitable for use in accordance with the invention are limited inter alia by the fact that, if their molecular weight is too low, the resistance of the coating to hot water, i.e. to the cooking involved in sausage production, is inadequate and, if their molecular weight is too high, difficulties in regard to film formation are encountered during the coating process.

The range of variation in regard to the composition of the copolymers or terpolymers suitable for use in accordance with the invention is limited inter alia by the fact that, on the one hand, the coating should not be too soft, because otherwise the casing would block when stored in roll form, and on the other hand should not be too brittle because otherwise the impermeability of the coating could deteriorate under the effect of mechanical loads applied to the casing.

Accordingly, copolymers based on partially hydrolyzed polyvinyl acetate used in accordance with the invention preferably have a degree of hydrolysis of $>90\%$ and a molecular weight of $>50,000$ g/mol; acrylonitrile-containing bipolymers or terpolymers preferably have an acrylonitrile content of $\geq 25\%$ by weight and a molecular weight of $>25,000$ g/mol; and acrylate-containing copolymers preferably have a molecular weight of $>150,000$ g/mol.

According to the invention, the tubular casings have an additional oxygen barrier layer based on physically drying one-component or chemically drying two-component PUR (polyurethane) systems having an oxygen permeability of $\leq 120$ cm$^3$/m$^2$.24 h bar and a surface tension of $\geq 38$ N/m.

Suitable one-component polyurethane lacquers are, for example, those based on predominantly linear, fully reacted polyurethanes which are emulsified, dispersed or dissolved in organic lacquer solvents, but preferably in water, and which no longer contain any reactive centers, i.e. the physically drying lacquers (see, for example, Kunststoff-Handbuch, Vol. 7 "Polyurethane (Polyurethanes)", edited by Günter Oertel, Carl-Hanser-Verlag, München/Wien (1983), page 551). Suitable physically drying lacquers of this type are, for example, those of which the binders are based on a fully reacted linear polyurethane of (i) a polyester diol, (ii) a chain-extending agent and (iii) a diisocyanate. Suitable polyester diols (i) for the production of these polyurethanes are, for example, adipic acid/alkanediol/polyester diols having a molecular weight in the range from 600 to 3000. The alkanediols are, for example, 1,4-butanediol, 1,6-hexanediol, neopentyl glycol or mixtures of these glycols. Suitable chain-extending agents (ii) are, for example, diols of the type used for the production of the polyester diols and also diamines, such as hexamethylenediamine or isophoronediamine. Suitable diisocyanates (iii) are, for example, 4,4'-diisocyanatodiphenyl methane, hexamethylene diisocyanate or isophorone diisocyanate. The polyurethanes are produced in known manner by reaction of the starting materials in quantities corresponding to an equivalent ratio of isocyanate groups to isocyanate-reactive groups of approx. 0.9:1 to 1.1:1.

The particularly preferred two-component polyurethane lacquers are those of which the binder is a two-component polyurethane system, for example of the type described in the Kunststoff-Handbuch cited in the previous paragraph, pages 541 to 544. The two-component binders of these lacquers generally consist of a polyisocyanate component and a polyol component, the quantities of these components corresponding to a molar NCO:OH ratio of 0.5:1 to 2:1 and preferably 0.8:1 to 1.5:1. Suitable polyisocyanates are the known lacquer polyisocyanates, for example biuret-, isocyanate- or urethane-modified derivatives of simple diisocyanates, such as 2,4-diisocyanatotoluene or mixtures thereof with 2,6-diisocyanatotoluene and, more particularly, 1,6-diisocyanatohexane, the derivatives mentioned generally containing 10 to 25% by weight isocyanate groups.

Suitable polyols are, in particular, polyester polyols, polyether polyols or polyacrylate polyols.

The polyester polyols generally have a molecular weight of 500 to 5000 g/mol and contain at least 2 and preferably 2 to 6 hydroxyl groups per molecule.

The polyether polyols generally have a molecular weight of 500 to 5000 g/mol and contain at least two hydroxyl groups per molecule.

The acrylate polyols have a molecular weight of 500 to 5000 and generally contain 1 to 12% by weight hydroxyl groups.

The organohalogen-free coating is preferably applied from aqueous solution.

To facilitate the preferred application of the organohalogen-free coating from aqueous solution, emulsion or dispersion, the copolymers mentioned may also contain polar groups, such as carboxyl or hydroxyl groups, in known manner in order to improve their dispersibility or emulsifiability. The aqueous coating systems according to the invention based on the described copolymers may additionally contain typical auxiliaries for improving the dispersibility or emulsifibility of the copolymers and also known additives, such as catalysts, pigments, solvents, flow control agents, fillers, lubricants, spacers, etc.

To prevent possible blocking, the PUR systems mentioned may additionally contain binders having a $T_G$ value of >80° C. in quantities of 0.5 to 10% by weight, based on the binder as a whole. Styrene/acrylate copolymers and styrene/acrylate/MA (maleic anhydride) terpolymers having a $T_G$ value in the range from 80° to 120° C. are mentioned in this regard.

As already described, the particular effect of the organohalogen-free coating according to the invention is that surprising synergistic effects in regard to impermeability to water vapor and oxygen occur in conjunction with the substrate material. The barrier properties obtainable by the combination of wax and polymeric binder are considerably better than might have been expected on the basis of an addition of the barrier effects of the individual components for a comparable coating thickness. In addition, there is a distinct increase in the stability of the property profile to the thermal and mechanical stressing which the casings normally encounter in the course of sausage production and distribution.

Auxiliaries may be added to the coating compositions according to the invention present in the form of aqueous emulsions or dispersions in order to counteract coagulation of the polymer particles and hence to increase the stability of the dispersion or even to lead to emulsifiability or dispersibility of the polymer from the outset. The auxiliaries are generally anionic, cationic and neutral, low molecular weight, oligomeric or polymeric emulsifiers, surfactants or protective colloids of known type (cf., for example, Ullmanns Encyklopädie der technischen Chemie, Vol. 2, pages 273–281, Verlag Chemie, Weinheim (1972) or ebenda Vol. 10, pages 449–473 (1975)).

The coatings a and b may be applied in any order.

The copolymers and waxes to be used in accordance with the invention or mixtures thereof are converted into an aqueous solution, emulsion or dispersion in known manner either by dissolution in a water-miscible solvent, such as acetone or tetrahydrofuran, and subsequent addition of water and removal of the solvent or by application of intensive shearing, for example with an Ultra-Turrax stirrer using nozzles or dissolver disks.

The aqueous solution, emulsion or dispersion preferably has a solids content of 15 to 35% by weight. A viscosity range of 50 to 60 mPas.sec. is recommended for optimal application of the coating.

Without restricting the scope of the invention in any way, it is again pointed out that
- the coating should show adequate adhesion to the substrate and
- should undergo shrinkage to the same extent as the substrate.
- In addition, these properties should be retained despite the thermal and mechanical stressing typically encountered in sausage production and distribution (cf. G. Effenberger, Wursthüllen Kunstdarm, Herstellung, Eigenschaften und Anwendung, Holzmann Buchverlag, D-8939 Bad Wörishofen (1991)).

The invention is illustrated by the following Examples. The percentage concentrations mentioned are based on the solids content while the permeation values cited are determined in accordance with DIN (water vapor: DIN 53 122, 23° C./85% rel. humidity; oxygen: DIN 53 380, 23° C./75% rel. humidity). To determine weight losses, 50 cm long cuts of 60 mm caliber casing are filled with Brühwurst sausage mix and stored in a refrigerator at 2° C./65% relative humidity).

EXAMPLE 1

An approx. 500 mm long and 152 mm wide conventional fiber-reinforced tubular casing based on regenerated cellulose (Wolff Walsrode AG, D-3030 Walsrode) moistened with a spray bottle is drawn onto a 550×153 mm aluminium plate. The plate is then placed in a drying cabinet preheated to 165° C. against the thermocouple and dried up to a surface temperature of 118° to 125° C. After removal and cooling, an aqueous 1.2% polyamidoamine resin solution (Nadavin LT N, a product of Bayer AG, D-5090 Leverkusen) is applied by a hand coating knife to the absolutely flat casing. The casing coated with the primer is then dried in the drying cabinet up to a surface temperature of 130° C. and subsequently cooled to room temperature.

The sample is then coated with an aqueous commercially available aliphatic 30% PUR dispersion based on a fatty-acid-modified air-drying polyurethane (VP LS 2943 E, a product of Bayer AG 5090, Leverkusen 1) according to Example 1 and subsequently dried at 130° C.

The sample is then coated with a 40% aqueous dispersion, of which the binder consists of a copolymer of 30% acrylonitrile, 55% butadiene, 6% methacrylic acid, 7% methacrylamide and 2% styrene and which additionally contains a 5% commercially available emulsifier and is additionally modified with a 10% polyolefin dispersion (Sebosan NGB, a product of Stockhausen, D-5150 Krefeld) and dried at 120° C.

A multilayer tubular casing is obtained. The layer thickness of the individual coatings is 12 μm, the first layer has a surface tension of ~42 mN/m and the polyolefin-containing layer has a surface tension of ~30 mN/m.

The coating as a whole has a permeability to water vapor of ~24 g/m².24 h and a permeability to oxygen or 28 cm³/m².24 h.bar.

EXAMPLE 2

A tubular casing according to Example 1 is coated with a polyamine primer and with the PUR layer according to Example 1 and then with a 40% aqueous polyolefin-modified dispersion and dried at 120° C. The binder of this dispersion consists of a copolymer of 30% acrylonitrile, 45% butadiene, 4% methacrylic acid, 7% methacrylamide and 14% styrene. It also contains 5% commercially available emulsifiers and, in addition, 15% of a polyolefin dispersion (Talofin E S, a product of Stockhausen, D-4150 Krefeld).

A multilayer tubular casing is obtained. The layer thickness of the individual coatings is ~12 μm, the surface tension of the first layer is ~42 mN/m and the surface tension of the polyolefin-containing layer is ~30 mN/m.

The coating as a whole has a permeability to water vapor of ~24 g/m$^2$.24 h and a permeability to oxygen of 28 cm$^3$/m$^2$.24 h.bar.

The coatings thus produced are distinguished by their elasticity, their lacquer anchorage, their resistance to boiling and the adhesion of the sausage filling.

EXAMPLE 3

A tubular casing is coated with the polyamine primer as in Example 1. The sample is then coated successively with an aqueous commercially available aliphatic emulsifier-free PUR dispersion (VP LS 2952 E, a product of Bayer AG) and then with a mixture consisting of 9.0 parts —COOH— functional polyacrylonitrile dispersion (40%, acrylonitrile content 40%—KA 8250, a product of Bayer AG) and 1.0 part polyolefin emulsion (50% wax dispersion, Mobilcer 216, a product of Mobil, D-2000 Hamburg) in accordance with Example 1.

A multilayer tubular casing is obtained. The layer thickness of the individual coatings is ~12 μm. The surface tension of the first layer is ~42 mN/m and the surface tension of the second layer ~32 mN/m.

The coating as a whole has a permeability to water vapor of ~25 g/m$^2$.24 h and a permeability to oxygen of ~26 cm$^3$/m$^2$.24 h .bar.

The coatings thus produced are distinguished by their elasticity, strength of adhesion, lacquer anchorage and adhesion of the sausage filling.

EXAMPLE 4

A sausage casing is prepared as in Example 3 and coated with a PUR-based oxygen barrier layer. It is then coated with an aqueous dispersion consisting of 18% Joncryl 77 (an acrylate dispersion of S. C. Johnson Polymer b.v., NL-3641 RV Mijdrecht) and 7% Ultralube W 7090 (a wax dispersion of Surface-Chemie GmbH, D-5448 Kastelaun). Film formation takes place on reaching a surface temperature of 145° C.

A flexible, non-tacky, firmly adhering coating having a dry film thickness of approx. 12.8 μm is obtained and provides the casing with a permeability to water vapor of 18 g/m$^2$.24 h and a permeability to oxygen of 30 cm$^3$/m$^2$.bar.597 24 h. When the casing thus coated was subsequently used for the production and storage of Brühwurst, it was found that the coating shrinks to the same extent as the substrate material and retains its properties despite the thermal and mechanical stressing which it undergoes. The weight loss after 10 days is 1.8%.

EXAMPLE 5

A sausage casing is prepared and lacquered in the same way as in Example 4, except that the Ultralube W 7090 is replaced by 7% Michem Lube 160 E (a product of Michelman Int. & Co. SNC, B-6790 Aubange).

A flexible, non-tacky, firmly adhering coating having a dry film thickness of approx. 13.2 μm is obtained and provides the casing with a permeability to water vapor of 10 g/m$^2$.24 h and a permeability to oxygen of 28 cm$^3$/m$^2$.bar.24. When the casing is used as in Example 4 for the production and storage of Brühwurst, a weight loss of 1.9% is obtained after 10 days. The material meets the requirements according to the invention in regard to its shrink-ability and resistance to thermal and mechanical stressing.

EXAMPLE 6

A sausage casing is prepared and lacquered as in Example 1. The final coating applied is an aqueous dispersion containing 30% Styrofan DS 2306 X (a product of BASF AG, W-6700 Ludwigshafen) and 3% Michem Lube 182 (a product of Michelman Int. & Co. SNC, B-6790 Aubange).

A flexible, non-tacky, firmly adhering coating having a dry film thickness of approx. 15.2 μm is obtained and provides the casing with a permeability to water vapor of 14 g/m$^2$.24 h and a permeability to oxygen of 28 cm$^3$/m$^2$.bar.24. When the casing is used as in Example 4 for the production and storage of Brühwurst, a weight loss of 2.1% is obtained after 10 days. The material meets the requirements according to the invention in regard to its shrink-ability and resistance to thermal and mechanical stressing.

COMPARISON EXAMPLE 1

An approx. 50 cm long cut of a fiber-reinforced sausage casing (FRO-E, caliber 105 mm, a product of Wolff Walsrode AG, D-3030 Walsrode) is drawn onto a glass plate of suitable size and moistened by spraying with water. The sample thus prepared is then placed in a recirculating air drying cabinet preheated to 180° C. until a surface temperature of 118°–125° C. is reached and is then cooled to room temperature. The completely flat casing is then knife-coated on one side. A primer is applied first using an aqueous solution containing 1.2% of a polyamide/epichlorohydrin resin (Kymene SLX, a product of Hercules, D-5200 Siegburg) and 10% glycerol. The sample is dried in a recirculating air drying cabinet until a surface temperature of 125° C. is reached and is subsequently cooled to room temperature. A 32% aqueous polyethylene dispersion (Worlee-Wax 8510, Worlee GmbH, D-2400 Lübeck) is then applied in the same way. The final surface temperature of the sample during the film-forming process is 145°–150° C.

A brittle, poorly adhering coating having a dry film thickness of approx. 10 μm is obtained, providing the casing with a permeability to water vapor of 120 g/m$^2$.24 h. The uncoated casing has a permeability to water vapor of >2000 g/m$^2$.24 h.

COMPARISON EXAMPLE 2

A sausage casing is prepared and lacquered in the same way as in Example 4, the casing being coated with a polyolefin-free 18% aqueous dispersion of an acrylate copolymer (Joncryl 77, a product of S. C. Johnson Polymer b.v., NL-3641 RV Mijdrecht). Film formation takes place under the same conditions as in Example 1.

A flexible, low-tack, firmly adhering coating having a dry film thickness of approx. 12.3 μm is obtained, providing the substrate with a permeability to water vapor of 339 g/m$^2$.24 h and a permeability to oxygen of 200 cm$^3$/m$^2$.bar.24 h. The uncoated casing has a permeability to oxygen of 240 g/m$^2$.bar.24 h.

We claim:

1. A multilayer organochlorine-free tubular casing based on a substrate of regenerated cellulose, characterized in that at least one surface of said casing is coated with
   a. a 5 to 40 μm thick, olefin-modified polymeric chlorine-free water vapor barrier layer which has a permeability to water vapor of at most 50 g/m².24 hr and a surface tension of $\leq$ 34 N/m said olefin-modified polymeric chlorine-free water vapor barrier layer having been modified with a natural or synthetic wax having a melting range between 50° and 110° C. and a molecular weight of from 1500 to $1 \times 10^6$ g/mol in an amount of from 1–50% by weight of the so modified water vapor barrier layer,
   b. an additional 5 to 40 μm thick, polymeric oxygen barrier layer based on polyurethane systems which has a permeability to oxygen of at most 120 cm³/m².24 h bar and a surface tension of $\geq$ 38 N/m.

2. A tubular casing in accordance with claim 1, wherein said regenerated cellulose is fiber reinforced.

3. A tubular casing as claimed in claim 2, characterized in that fibers selected from the group consisting of natural fibers, paper fibers, polyamide fibers, polyester fibers and polyacrylonitrile fibers are used for reinforcement.

4. A tubular casing in accordance with claim 1, wherein said surface of said casing is coated with a primer, said primer being an aqueous solution, dispersion or emulsion based on aliphatic polyamidopolyamines optionally containing additional cationic groups prior to being coated with said layer a. or b.

5. Tubular casings as claimed in claim 1, characterized in that aqueous physically drying, aliphatic one-component PUR systems having a surface tension of 38 to 50 N/m are used for the formation of the oxygen barrier layer.

6. A tubular casing as claimed in claim 5, characterized in that one-component PUR systems are modified with unsaturated fatty acids.

7. A tubular casing as claimed in claim 1, characterized in that polymeric binders or binder mixtures of at least one of the following monomers: acrylates, methacrylates, vinyl acetate, vinyl alcohol, ethylene, butadiene, styrene, acrylic acid and methacrylic acid, acrylamide and acrylonitrile, which have an additional polyolefin modification are present as the water vapor barrier layer.

8. A tubular casing as claimed in claim 7, characterized in that it contain modifiers based on natural and synthetic waxes.

9. The use of the tubular casings claimed in claim 1 for the production of sausage casings.

* * * * *